LOGIC CONTROLLED DEFLECTION SYSTEM

Filed Sept. 15, 1967

INVENTOR
ROBERT A. THORPE

BY Joseph J Connolly
ATTORNEY

Jan. 14, 1969 R. A. THORPE 3,422,304

LOGIC CONTROLLED DEFLECTION SYSTEM

Filed Sept. 15, 1967 Sheet 3 of 3

United States Patent Office 3,422,304

Patented Jan. 14, 1969

3,422,304

LOGIC CONTROLLED DEFLECTION SYSTEM

Robert A. Thorpe, Poughkeepsie, N.Y., assignor to International Business Machines Corporation, Armonk, N.Y., a corporation of New York

Filed Sept. 15, 1967, Ser. No. 667,915

U.S. Cl. 315—18 10 Claims

Int. Cl. H01j *29/00;* G08b *23/00*

ABSTRACT OF THE DISCLOSURE

Apparatus for providing a high precision cathode ray tube display uses a hybrid digital deflection system, a decimal weighted system for the coarse or major deflection and a binary weighted system for the fine or minor deflection, the fine deflection providing uniform incremental steps between major deflection units. To correct for pin cushion distortion, the major deflection circuit is modified to provide deflection signals varying in amplitude as a function of beam position on the CRT face. A digital control circuit then adjusts the minor deflection increments to conform to a function of the status of the major deflection signal.

*Cross reference to related applications*

Copending application Ser. No. 604,900, "Digital Cathode Ray Tube Deflection System," filed by Frank R. Carlock et al. Dec. 27, 1966 shows a hybrid digital deflection system having decimal and binary weighted major and minor deflection circuits respectively. Copending application Ser. No. 561,891, "Corrected Deflection System for Flat Faced Cathode Ray Tubes," filed by Frank R. Carlock et al. June 30, 1966 shows a pin cushion correction circuit which may be employed to correct the major deflection system.

*Background of the invention*

As display terminals find increasing use in man/machine communications with a data processor, it becomes desirable to control the display device with digital signals. Digital deflection systems for computer controlled cathode ray tube displays have been utilized for some time, a typical example being shown in U.S. Patent 2,810,860 to Mork. The deflection system in the referenced patent utilizes binary weighted switchable constant current sources controlled by binary coded signals to drive the deflection yoke. However, the binary weighted switchable current sources are generally not accurate to the desired degree due to the variation between the current source provided by the highest ordered bit relative to the current required for the low ordered bit. One solution to this problem, shown in U.S. Patent 3,290,671 to W. R. Lamoureux, consists of dividing the digital word into bytes and decoding on a byte basis, thus decreasing the relative significance between the high and low order bits. However, this is primarily an analog solution which requires adjustments and alignments to ensure the current sources are precise. The straight binary weighted constant current deflection systems provide an inherent lack of relative accuracy of the image resulting in distortion. Such distortion may take many forms, i.e., lines longer or shorter than desired, angular distortion, distortions which can generally be corrected only by precise adjustments and compensation of the current sources or compensated by complex function generators. However, it is readily apparent that such modifications are undesirable, particularly on an operational system.

One of the proposed solutions to this problem may be defined as a hybrid deflection system having coarse and fine deflection components. In the referenced copending application Ser. No. 604,900, the deflection system comprised a number of switchable current sources, the outputs of which were summed together in a linear manner to drive the deflection yoke for beam positioning. The current sources were controlled by a logical arrangement comprising a high order system and a low order system, the high order system providing for major positioning of the beam over uniform intervals of the CRT screen, the low order system providing for beam incrementing within any of the major intervals. Such a system is susceptible to pin cushion distortion, particularly where a flat faced CRT is employed. One method of overcoming the pin cushion distortion is shown in the cited copending application Ser. No. 561,891. In pin cushion distortion, the amount of X correction required increases as the Y deflection deviates from center and vice-versa, so that X is corrected as a function of Y and Y as a function of X by circuit techniques. Additionally, the value of the resistors in the individual current switching networks of the major deflection circuitry are modified as a function of beam position. In a hybrid system comprising both coarse and fine deflection, pin cushion correction cannot be applied to the minor or binary deflection without undue complexity. Assuming that a hybrid system provided for pin cushioning correction of the coarse deflection only, the number of units of current required to move the beam a fixed distance will vary as a function of the relative position of the beam on the face of the tube. Thus, to move a given incremental distance at the center of the screen requires more current than to move exactly the same distance at the edge of the screen. Since the low order incrementing system must operate between the major positions anywhere on the screen, the incrementing distances provided by the minor deflection must also vary in accordance with the relative position of the beam on the CRT screen.

*Summary of the invention*

In accordance with the present invention, there is provided a deflection system comprising coarse and fine deflection components, the coarse and fine components being identified by the high or low order bits of the digital word, in which the current from the low order system is modified as a function of the position or status of the high order system by completely digital means. As more fully described hereinafter, the major deflection components or stages are weighted to provide uniform deflection over equal intervals of the CRT screen irrespective of the relative location of the origin of the CRT beam. Each unit of major deflection is divided into a plurality of minor deflection components, the value of which will vary according to the relative position of the beam on the CRT. The major deflection components are not position dependent so that only an initial adjustment is necessary. The major deflection is controlled by a fifteen stage step-up/step-down counter with a current summing network connected in a push-pull configuration to the horizontal deflection coil. In the illustrated embodiment having a system capability of 256 positions in X and Y, each stage of the counter contributes enough current to move the CRT beam 1/16 of the total distance across the screen, or sixteen raster units. The minor deflection comprises a four bit binary weighted incremental register having its own current summing network. The incremental register output current provides the means of positioning the beam at any sixteen position between the coarse grid of 16 x 16 points provided by the major deflection. However, because the incremental register must provide this capability anywhere on the face of the CRT, it must adjust the amount of current supplied per raster unit as a function of the status of the counter. This adjustment is provided by controlling the bias or reference voltage of a summing circuit in which the major and minor deflection components are combined to provide the final deflection signal. The effect of changing the bias or reference voltage of the summing circuit produces a change in the voltage across the resistors of the summing network of the incremental register, and thus changes the current output of the summing network. The condition of the control circuit is directly related at all times to the condition of the major deflection system.

Accordingly, a primary object of the present invention is to provide an improved deflection system.

Another object of the present invention is to provide an improved digital deflection system having major and minor deflection components wherein the major deflection signal varies as a function of beam position and the minor deflection signals are adjusted as a function of the associated major deflection signal.

A further object of the present invention is to provide a hybrid deflection system having coarse and fine deflection components wherein the major deflection system is pin cushion corrected and the fine deflection signals are adjusted to correspond to the angular distances provided by the associated major deflection component.

The foregoing and other objects, features and advantages of the invention will be apparent from the following more particular description of a preferred embodiment of the invention as illustrated in the accompanying drawings.

*Description of the preferred embodiment*

Figure 2:
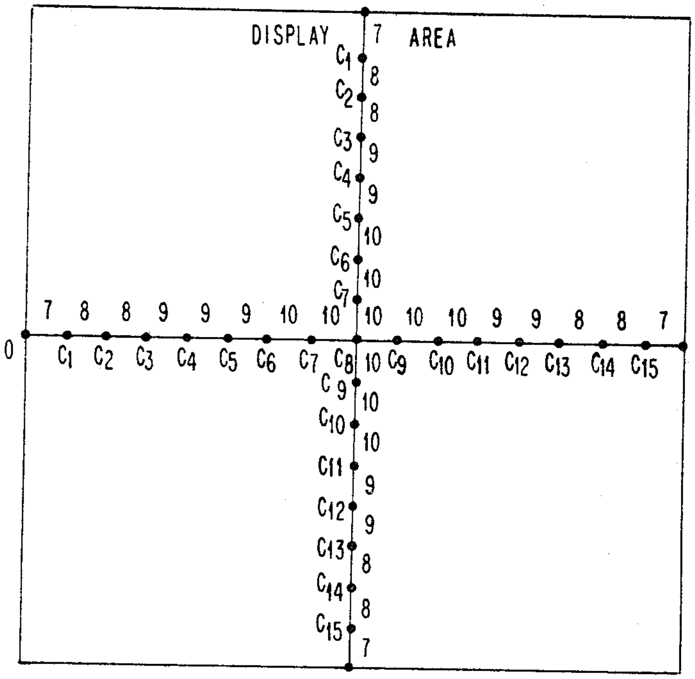
FIGURE 2 illustrates the variation of deflection current as a function of beam position.

Referring now to the drawings and initially to FIGURE 2 thereof, there is illustrated in graphical form the differential deflection current requirements as a function of beam position on a display area. It should be recognized that the designated current quantities are relative only and are shown by way of example, and that while only the horizontal axis is illustrated, a similar variation occurs with respect to the vertical deflection. In the preferred embodiment, a counter having positions $C_1$–$C_{15}$ is used in the horizontal deflection circuitry. The incremental distance provided by each of the counter positions $C_1$–$C_{15}$ is identical, the center portion of the display area being illustrated at the $C_8$ position. Starting from the center position, it is seen that ten units of current are required to move each of three increments of distance in either direction. The next two increments of distance in either direction require nine units, the following two eight units and the final single increment only seven units of current. Thus, it will be appreciated that as the beam is deflected horizontally in either direction from the center of the screen, a lesser amount of current is required to deflect the beam a specified distance. It is further apparent from FIGURE 2 that none of the specified values of current will work at all locations, but the amount of current required to deflect the beam a given distance varies depending on the beam position. The increments of distance specified as $C_1$–$C_{15}$ are provided by the major deflection system, while within each major deflection a total of sixteen addressable raster units are provided by a minor deflection system. The present invention provides a digital deflection system for automatically adjusting the gain correction of the minor deflection as a function of beam position anywhere on the CRT screen.

Figure 1:
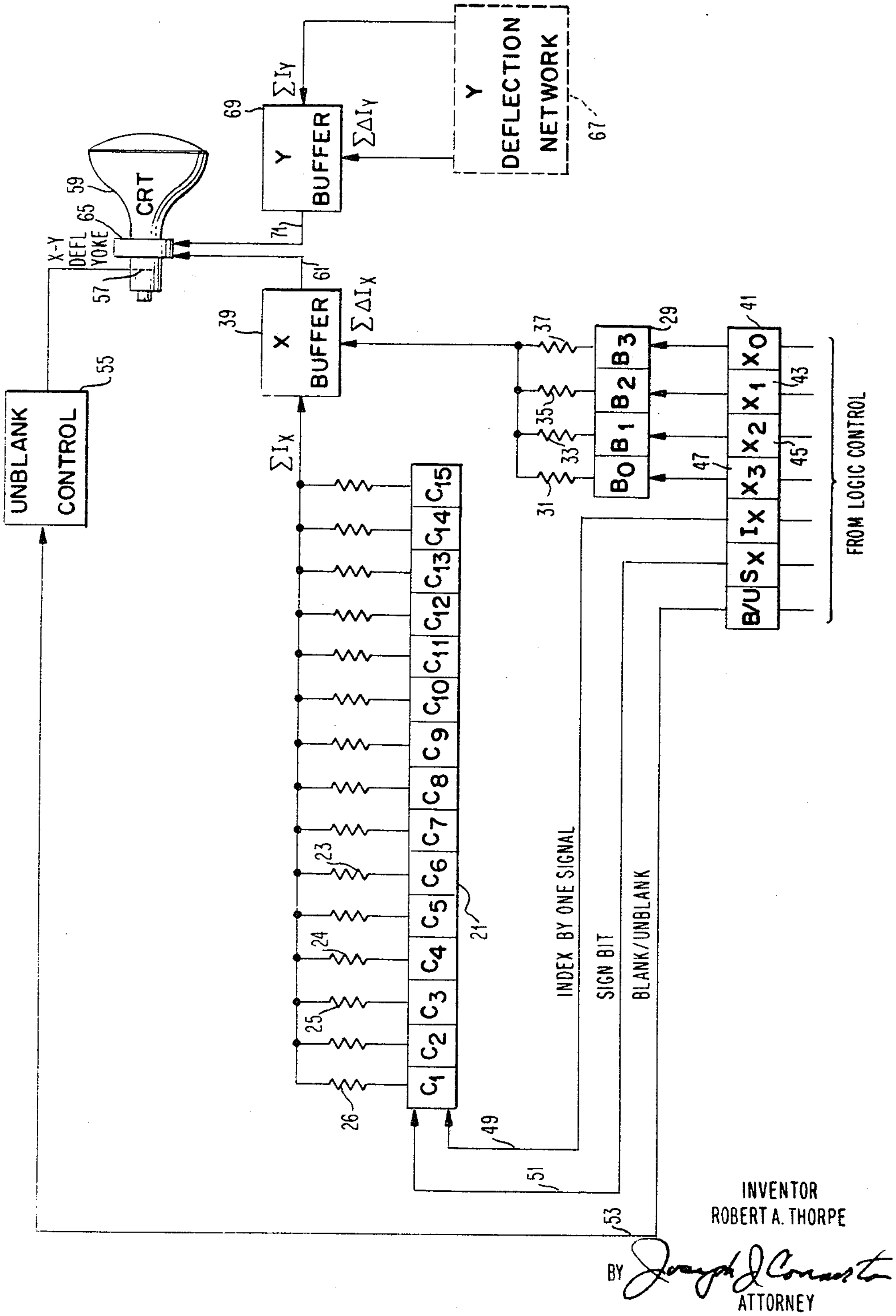
FIGURE 1 illustrates in block form an environmental display system of the type contemplated by the present invention.

Referring now to FIGURE 1, there is illustrated in block logic form a hybrid deflection system having both decimal and binary weighted deflection to permit beam movement on the screen between specified addresses. In the interest of clarity, the deflection system is illustrated as single ended, although as more fully described hereinafter, a dual ended push-pull yoke driving system may be employed and is in fact contemplated in the preferred embodiment of the instant invention. A more detailed showing of a push-pull magnetic yoke deflection system is shown in U.S. Patent 3,325,803 to Carlock et al. The system shown in FIGURE 1 contemplates an address capability of 256 positions in both X and Y. The beam positioning system comprises a high order fifteen position decimal count-up/count-down counter 21, the respective stages of which apply current through their associated resistors 23, 24, 25, 26 to a current summing network 39. Each stage of the counter contributes enough current to move the CRT beam $\frac{1}{16}$ of the total distance across the screen, or 16 raster units. The counter thus provides coarse positioning to a grid of 16 x 16 points. The amount of current contributed by a given stage to move sixteen raster units on a screen varies in the manner previously shown in FIGURE 2, i.e., as a function of position. The amount of current supplied by any one stage is controlled by the value of the associated resistor, four different values of which are identified by subscripts 23, 24, 25 and 26 to provide the four units of current shown in FIGURE 2. Positioning of the beam within the individual coarse adjustments is provided by a four bit binary weighted incremented position register 29 which is interconnected through binary weighted resistors 31, 33, 35 and 37 to current summing network 39. The incremental register output current provides the means of positioning the beam at any sixteen positions between the coarse grid of 16 x 16 points provided by the output of counter 21. However, because the incremental register must provide this capability anywhere on the face of the CRT, it must adjust the amount of current supplied per raster unit as a function of the status of the counter. In other words, to move one raster unit at the center of the screen would require ten units of current divided by sixteen raster units or $\frac{5}{8}$ units of current per raster unit, while at the edge of the screen, only $\frac{7}{16}$ units of current are required per raster unit. The incremental register 29 is connected to the four lower order bits of the X deflection signal shown in storage stages 41, 43, 45 and 47 which also includes three control signals. The index by one signal on line 49 increments the counter 21 at the same time that register 29 is loaded. The sign bit on line 51, as more fully described hereinafter, is the control signal for controlling the counter direction, i.e., up or down. The blank/unblank signal on line 53 is connected to an unblank control circuit 55 to the control grid 57 of CRT 59. While connected as above described, the current summing network 39 contains the current summation from decimal counter 21 as well as binary counter 29, and the combined out signal is applied through line 61 to the X winding of the deflection yoke 65. An identical deflection network shown as block 67 is utilized for the Y deflection, and the resultant currents combined in current summing network 69 and applied via line 71 to the Y deflection winding of the yoke 65. As previously noted and more fully described hereinafter, the preferred embodiment of the system is operated in a push-pull mode whereby the equipment shown in FIGURE 1 would be essentially duplicated to generate the $\overline{X}$ equipment and likewise with respect to the Y axis to generate the $\overline{Y}$ signals.

Figure 3:
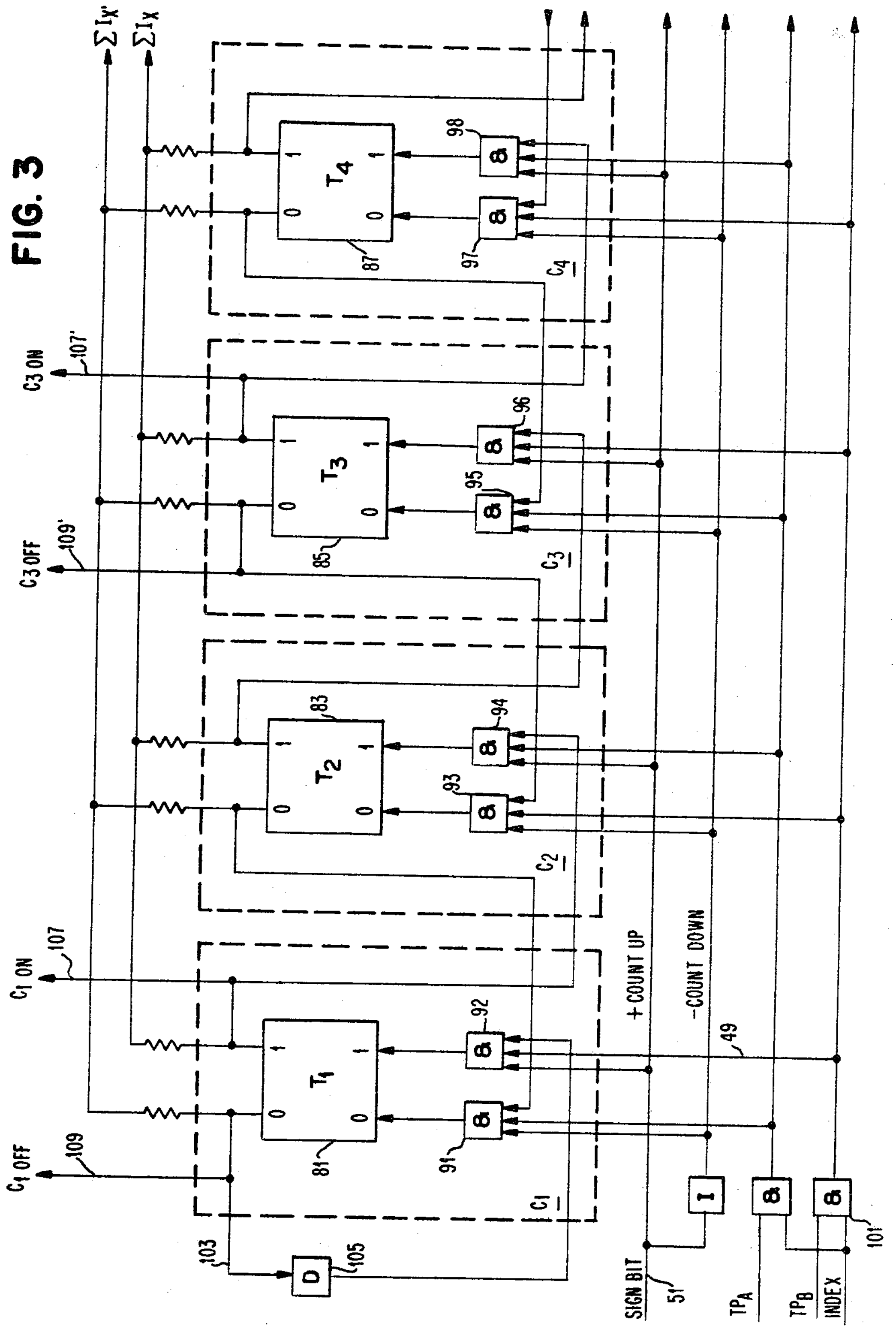
FIGURE 3 illustrates in block logic form the details of the counter stages shown in block 1 of FIGURE 1.

Referring now to FIGURE 3, there is illustrated in block schematic form details of the first four stages $C_1$, $C_2$, $C_3$ and $C_4$ of decimal counter 21. Each of the counter stages comprises a trigger 81, 83, 85 and 87, the states of which are controlled by their associated logic AND circuits 91–98. Considering the first stage as illustrative of the counter operation, the trigger is set in the one state by the logical AND circuit 92 and reset to the zero state by logical AND circuit 91. The conditions to set trigger 81 to the one state are a count-up signal on line 51, an index signal provided by logical AND circuit 101 to line 49 and a reset output from trigger 81 on line 103 which is delayed through delay circuit 105. It should be noted that the set or binary 1 output from all the counter stages comprise one of the input conditions to the succeeding stage. However, with respect to the first stage, the rest output of the same stage is used to condition the set input of the trigger such that the trigger can be turned on if and only if the first stage is initially in the off condition. The remaining stages operate as a conventional decimal counter in which two of the inputs are common to all stages, but only one stage will be conditioned by the preceding stage. Each of the odd counter stages has an on and off output, designated $C_1$ ON, $C_1$ OFF, etc. which is used for control purposes, as described in greater detail hereinafter. For example, the $C_1$ ON and $C_3$ ON conditions are shown on lines 107 and 107′ and the $C_1$ OFF and $C_3$ OFF conditions are shown as lines 109 and 109′. The manner in which the counter outputs condition or control the minor deflection generated by the incremental counter will now be described relative to FIGURE 4.

Figure 4:
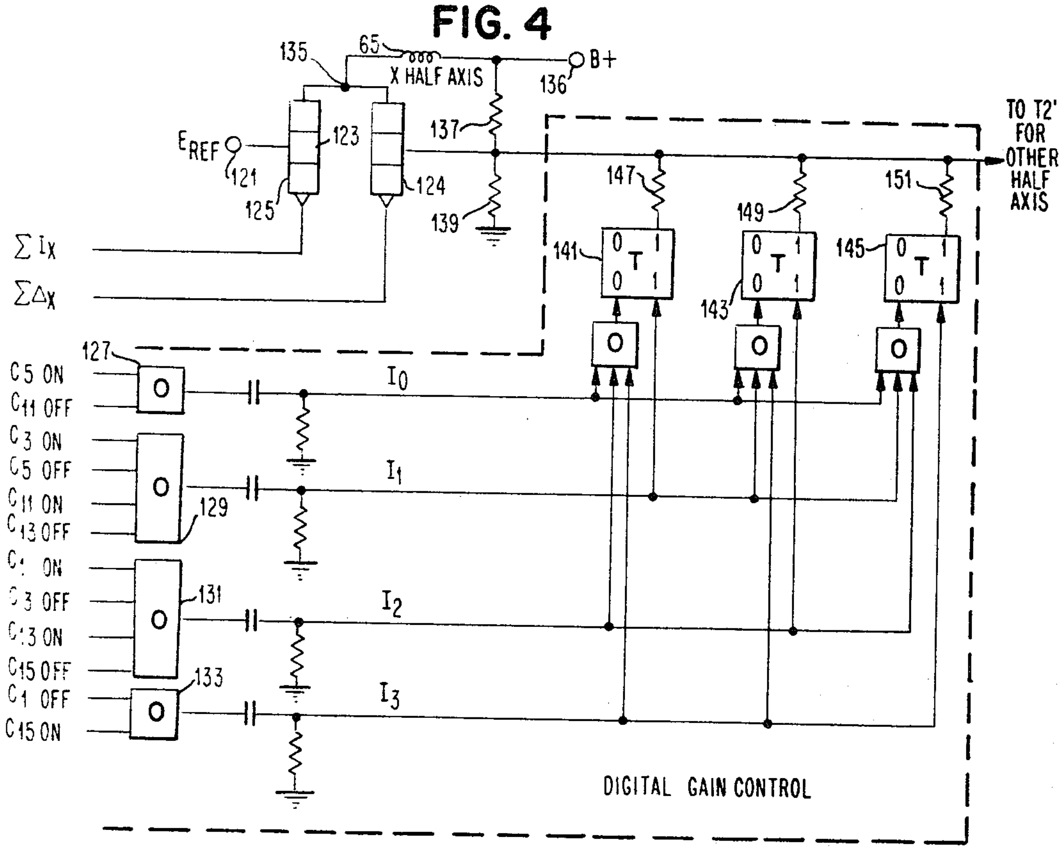
FIGURE 4 illustrates in block schematic form details of the control circuitry for adjusting the output of the minor deflection as a function of the major deflection.

Referring now to FIGURE 4, there is illustrated in logic schematic form the current summing network shown as block 39 in FIGURE 1. Basically, the output of the binary weighted minor deflection circuit is specified as a function of beam position, which in turn is controlled by the output from decimal counter 21. The current supplied by any one stage of the decimal counter 21 is controlled by the value of the resistor associated with that leg of the counter, and by the reference voltage applied from terminal 121 to the base 123 of buffer transistor 125, which essentially sets the value of the voltage across the resistor network associated with counter 21 and thus sets the current. Referring briefly to FIGURE 2, it is noted that four different values of current are required to provide deflection to a uniform distance, the value depending on the location of the beam where the deflection originates. The four values are designated $I_0$, $I_1$, $I_2$ and $I_3$ and correspond essentially to 10, 9, 8 and 7 units of current respectively. The output of the incremental binary register in turn must be controlled as a function of the deflection location origin which will relate to one of the above four values. Table 1 is a truth table designating the incremental register output gain requirements as a function of the counter status, and corresponds to those values shown in FIGURE 2.

TRUTH TABLE

| Counter status | Incremental register output gain requirement | | | |
|---|---|---|---|---|
| | $I_0(10)$ | $I_1(9)$ | $I_2(8)$ | $I_3(7)$ |
| 0 | 0 | 0 | 0 | 1 |
| $C_1$ | 0 | 0 | 1 | 0 |
| $C_2$ | 0 | 0 | 1 | 0 |
| $C_3$ | 0 | 1 | 0 | 0 |
| $C_4$ | 0 | 1 | 0 | 0 |
| $C_5$ | 1 | 0 | 0 | 0 |
| $C_6$ | 1 | 0 | 0 | 0 |
| $C_7$ | 1 | 0 | 0 | 0 |
| $C_8$ | 1 | 0 | 0 | 0 |
| $C_9$ | 1 | 0 | 0 | 0 |
| $C_{10}$ | 1 | 0 | 0 | 0 |
| $C_{11}$ | 0 | 1 | 0 | 0 |
| $C_{12}$ | 0 | 1 | 0 | 0 |
| $C_{13}$ | 0 | 0 | 1 | 0 |
| $C_{14}$ | 0 | 0 | 1 | 0 |
| $C_{15}$ | 0 | 0 | 0 | 1 |

The manner in which the current output of the incremented register is adjusted as a function of the status of counter 21 is shown in FIGURE 4. The generation of the on and off values for the odd stages of the decimal counter output has been described with reference to FIGURE 3. The use of the odd stages only for control purposes is purely coincidental and relates only to the specific embodiment described herein. To obtain four distinct values of output current depending on the position of the decimal counter, the circuit operates as follows. The counter inputs to the gain control circuitry are shown applied to OR circuits 127, 129, 131 and 133. With respect to the inputs, the on condition signifies that the counter is counting up, while the off condition signifies that the counter is counting down.

The output of each of the logical OR circuits has an associated RC differentiating circuit for converting a level shift or transition to a positive pulse. The current summing network comprises transistors 123 and 124, transistor 123 being associated with the major deflection or $\Sigma I_x$ and transistor 124 being associated with the minor deflection, or $\Sigma \Delta I_x$, the output of the summing network being applied through terminal 135 to the horizontal winding of deflection yoke 65. The base of transistor 124 is normally biased by the voltage divider network comprising resistors 137 and 139 which are interconnected between the B+ power supply 136 and ground. The amount of current supplied by any one stage of the counter 21 is controlled by the value of its associated resistor for that stage, the four resistors 23 through 26 in FIGURE 1 providing four output levels, the reference voltage applied from terminal 121 to buffer transistors 125 which essentially sets the value of the voltage across the resistor and thus sets the current. The bias or reference voltage on the base of buffer transistor 124 is controlled to arbitrary levels by controlling the status of triggers 141, 143 and 145. In the quiescent condition, i.e., with triggers 141, 143 and 145 in the off condition, the bias of transistor 124 is controlled by the voltage divider circuit as previously 124 is controlled by the voltage divider circuit as previously described. During this state, the current applied through transistor 124 is the maximum value, i.e., $I_0$. The status of triggers 141, 143 and 145 may be changed by the logical conditions specified by OR circuits 127, 129, 131 and 133 whereby the effective impedance of the voltage divider network is changed, since resistors 147, 149 or 151 will be connected in parallel with resistor 139 through the associated trigger connected to ground. With trigger 141 on, current $I_1$ is provided, with trigger 143 on, current $I_2$, and with trigger 145, current $I_3$ is provided as shown in the truth table. Changing the reference voltage in this manner changes the emitter voltage of transistor 124, which in turn changes the voltage across the resistors of the summing network of the incremental register and thus the current output of the network. The number of levels and the current gain of each level is directly related to the 15 stage counter current summing network. As previously indicated in FIGURE 2, there are four assumed levels of current described in relative terms as 10, 9, 8 and 7 units contributed by the counter network, and accordingly, there are four corresponding levels of gain established for the control network. The logic control of this network is arranged such that none or only one of the triggers 141, 143 or 145 is on at any one time. This could vary, depending on the number of control levels required. The trigger input conditions are developed from the truth table shown in Table 1. The inputs physically result from the transition from off to the on or the on to the off sides of the counter stages, such that as a counter counts up or down, the gain of the incremental register output current is automatically adjusted.

While the above-described technique is efficiently utilized in the type of deflection system illustrated in the preferred embodiment, it can be applied to deflection systems using any of the number of bits and in fact could be applied to pure binary weighted systems. The gain control network effectively comprises a digital servo which provides the exact gain correction needed as a function of a position anywhere on the CRT screen.

While the invention has been particularly shown and described with reference to a preferred embodiment thereof, it will be understood by those skilled in the art that various changes in form and detail may be made therein without departing from the spirit and scope of the invention.

What is claimed is:

1. A deflection system for a cathode ray tube comprising in combination first means for producing a coarse deflection signal,
second means for producing a fine deflection signal,
means for summing said coarse and fine deflection signals to provide a composite deflection signal and
control means for adjusting said fine deflection signal as a function of said coarse deflection signal.

2. Apparatus of the type claimed in claim 1 wherein said first and second means produce deflection signals in accordance with a first and second radix.

3. Apparatus of the type claimed in claim 2 wherein said first radix comprises a decimal system modified as a function of the beam location as specified by said coarse deflection signal.

4. Apparatus of the type claimed in claim 3 wherein said second radix comprises a binary weighted system.

5. Apparatus of the type claimed in claim 4 wherein said control means includes a logical feedback circuit for controlling said fine deflection input to said summing means as a function of said composite signal.

6. Apparatus of the type claimed in claim 5 wherein the maximum deflection of said fine deflection circuit is equal to one coarse deflection unit.

7. A deflection system for a cathode ray tube comprising in combination a first plurality of current sources for producing a coarse deflection signal varying as a function of beam position,
a second plurality of current sources for producing a fine deflection signal,
said second plurality of current sources being weighted in a radix differing from said first current sources,
means for combining said first and second current sources to provide a composite deflection signal,
means for effecting deflection of said cathode ray tube in response to said composite deflection signal, and
means for modifying said fine deflection signal as a function of the position of said deflected beam.

8. A device of the character claimed in claim 7 wherein said first plurality of current sources are weighted in accordance with the resulted deflected position of said beam.

9. A device of the character claimed in claim 8 wherein said first plurality of current sources are also weighted in accordance with a decimal radix.

10. A device of the character claimed in claim 9 wherein said second plurality of current sources are weighted in accordance with a binary radix.

References Cited

UNITED STATES PATENTS

| | | | |
|---|---|---|---|
| 2,810,860 | 10/1957 | Mark | 315—27 |
| 3,116,436 | 12/1963 | Sweeney | 315—18 |
| 3,325,803 | 6/1967 | Carlock et al. | 340—324 |

RODNEY D. BENNETT, *Primary Examiner.*

C. L. WHITHAM, *Assistant Examiner.*

U.S. Cl. X.R.

340—324